C. C. RENSHAW.
AUTOMATIC SIGNAL.
APPLICATION FILED MAY 28, 1914.
1,265,385.
Patented May 7, 1918.
3 SHEETS—SHEET 1.
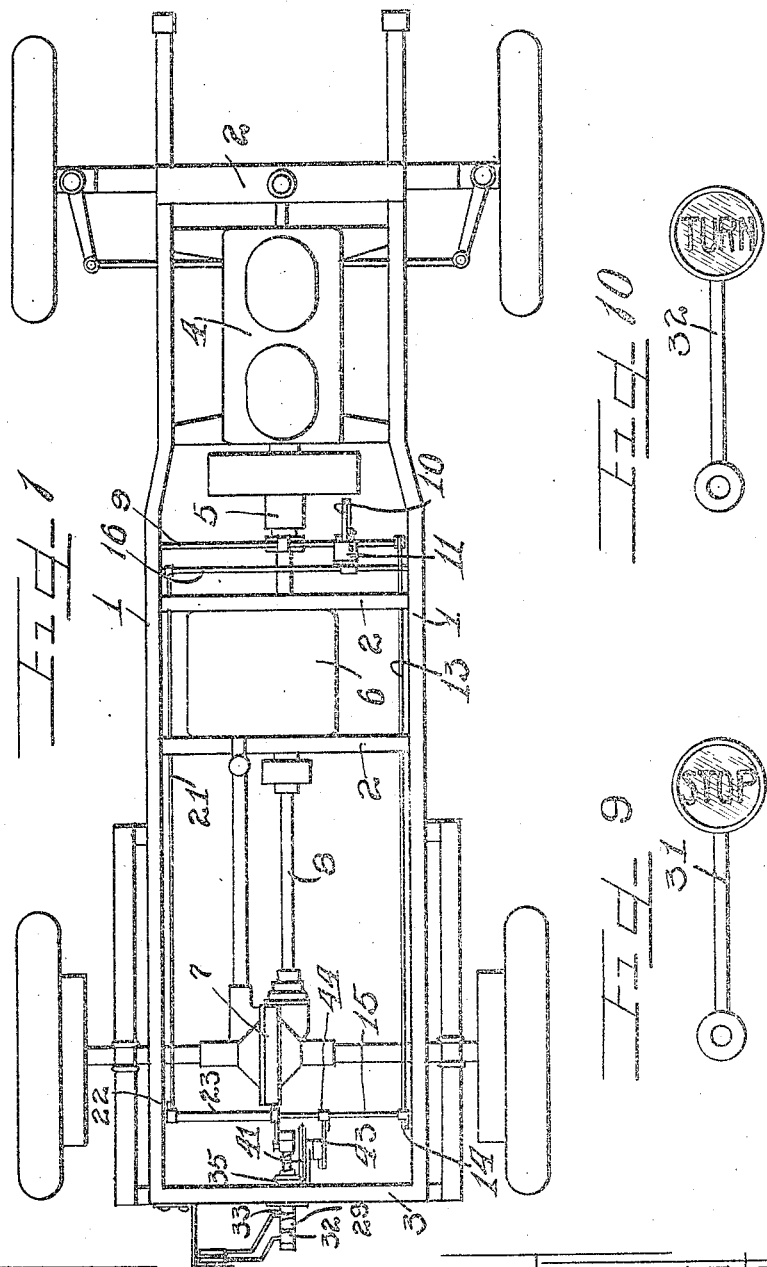

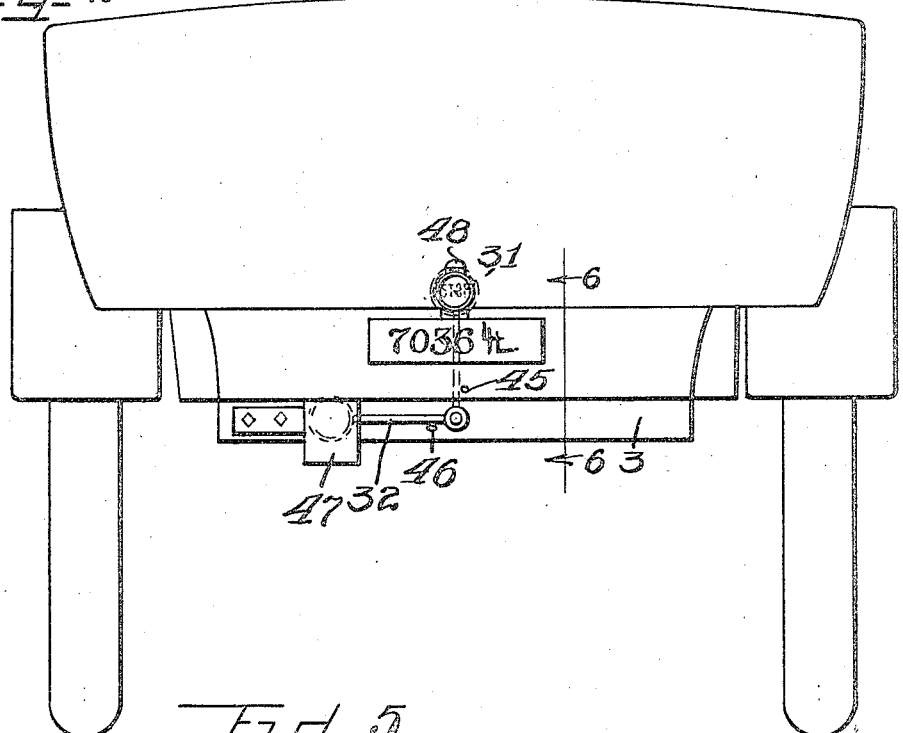
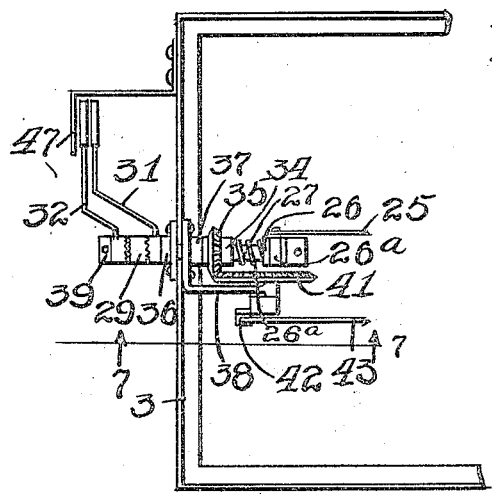
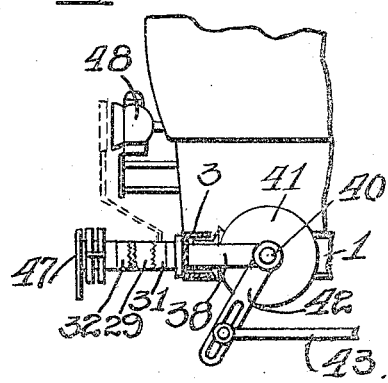

C. C. RENSHAW.
AUTOMATIC SIGNAL.
APPLICATION FILED MAY 28, 1914.
1,265,385.
Patented May 7, 1918.
3 SHEETS—SHEET 3.
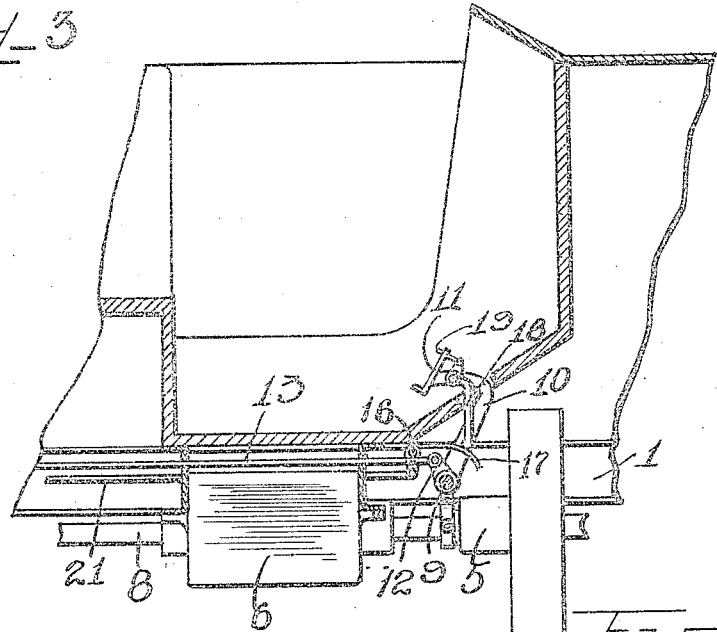
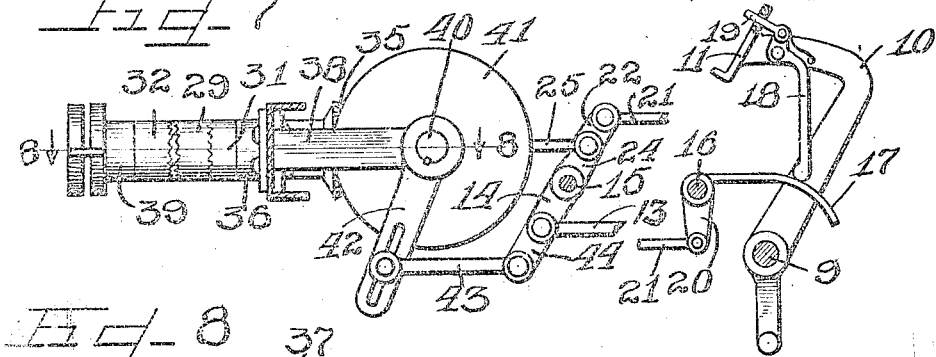
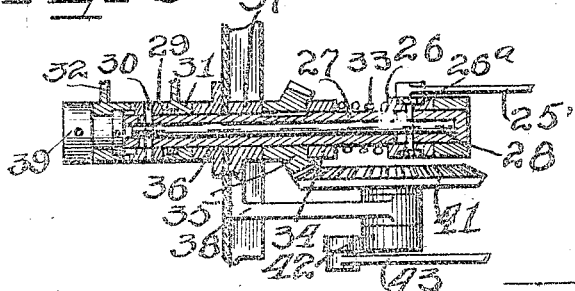

UNITED STATES PATENT OFFICE.

CHARLES C. RENSHAW, OF CHICAGO, ILLINOIS.

AUTOMATIC SIGNAL.

1,265,385.　　　　　Specification of Letters Patent.　　Patented May 7, 1918.

Application filed May 28, 1914. Serial No. 841,431.

*To all whom it may concern:*

Be it known that I, CHARLES C. RENSHAW, a citizen of the United States, and a resident of the city of Chicago, in the county of Cook and State of Illinois, have invented certain new and useful Improvements in Automatic Signals; and I do hereby declare that the following is a full, clear, and exact description of the same, reference being had to the accompanying drawings, and to the numerals of reference marked thereon, which form a part of this specification.

Accidents often happen in crowded thoroughfares, especially rear end collisions between vehicles, the congestion particularly in city traffic, preventing the drivers of the vehicles from ascertaining the probable movements of the vehicle ahead, and this is particularly true in the case of motor cars.

This invention relates to a means for automatically displaying a signal on the rear of a vehicle for the benefit of drivers on other vehicles behind, when a stop or turn is to be made, thus giving the operator in the rear ample time in which to determine a course of procedure.

It is an object of this invention to provide signal display means on motor driven or other vehicles whereby such means is connected for actuation with the mechanism controlling the movement of the vehicle, to thus automatically move the signaling means into display position when said vehicle controlling mechanism is operated.

It is also an object of this invention to construct double signaling means, each connected to the controlling mechanism of a motor car for automatic operation therewith, and so constructed as to permit only one of the signals to be displayed at one time.

It is also an object of this invention to provide signaling means which are connected to one of the controlling levers of a motor vehicle to be positively moved into signaling position when said lever is actuated.

It is also an object of this invention to provide double signaling means suitably associated with clutches whereby either one of said signals may be moved into signaling position by actuation of the controlling mechanism of a vehicle.

It is furthermore an object of this invention to construct a signaling means suitably connected for operation by clutches and gears adapted to be operated automatically when the controlling levers of a vehicle are actuated, and in which the clutches are of a nature to permit relative movement between the parts thereof in the event of carelessness or mistake on the part of the operator to prevent destruction of the device.

It is finally an object of this invention to construct a device simple in operation and consisting of few parts, adapted to be automatically thrown into operation by actuation of the controlling levers of a vehicle.

The invention (in a preferred form) is illustrated in the drawings and hereinafter more fully described.

In the drawings:

Figure 1 is a conventional top plan view of an automobile chassis with my invention adapted thereto.

Fig. 2 is a fragmentary rear elevation of a vehicle illustrating the signaling mechanism in operation.

Fig. 3 is a fragmentary sectional view of the front portion of a motor vehicle showing a controlling clutch or brake lever with the signaling mechanism connected thereto for simultaneous operation therewith.

Fig. 4 is an enlarged view illustrating the controlling lever with the signal operating mechanism connected thereon.

Fig. 5 is an enlarged fragmentary detail of the rear portion of the vehicle chassis showing the signaling means connected thereon.

Fig. 6 is a fragmentary view partly in section and partly in elevation taken on line 6—6 of Fig. 2.

Fig. 7 is an enlarged detail sectional view taken on line 7—7 of Fig. 5.

Fig. 8 is a section taken on line 8—8 of Fig. 7, with parts in elevation.

Fig. 9 is an enlarged front view of the stop signal arm.

Fig. 10 is a similar view of the turn signal arm.

As shown in the drawings:

Referring to Fig. 1 the side sills 1, of the chassis are suitably connected together by transverse members 2, and at the rear by a transverse member 3.

Suitably mounted upon the chassis frame, as is usual, is a motor 4, a combined fly wheel and clutch 5, a transmission casing 6, a differential 7, and a driving shaft 8, between the differential and the transmission. A shaft 9, is journaled transversely of the chassis, preferably near the clutch whereby suitable connections may be effected therebetween, but for convenience of illustration such connections are not shown here. Mounted on said shaft 9, is a lever 10, provided with a foot pedal 11, the foot pedal of course projecting upwardly through a suitable slot in the flooring of the vehicle body. A crank 12, is rigidly secured on said transverse shaft 9, and connected thereto is a rearwardly extending rod 13, which at its other extremity is pivotally connected to a crank 14, secured on a rotatable transverse shaft 15, near the rear of the chassis frame.

A supplementary transverse shaft 16, is journaled in the chassis frame near the shaft 9, and is provided with a forwardly extending downwardly curved crank arm 17, adapted to be engaged by a relatively long arm 18, of a bell crank pivotally mounted on the lever 10, the other end of said bell crank being provided with a pivoted link or pin member 19, projecting through an aperture in the pedal 11, and adapted to be contacted by the foot of an operator to actuate the bell crank and the crank 17, thereby, when the pedal is depressed.

Also connected on said shaft 16, near one end thereof is a downwardly extending crank arm 20, to which is pivotally connected a rearwardly extending rod 21, which at its other end is pivotally connected to a crank 22, secured on a sleeve 23, rotatable on said transverse shaft 15.

The signaling mechanism is mounted at the rear end of the chassis frame and is adapted to be operated by elements associated with said shaft 15, and said sleeve 23, which of course are operated through the mechanism described at the front end of the chassis. For this purpose an upwardly extending crank 24, is provided on said sleeve 23, and is connected by means of a suitable link 25, to a ring 26ª, journaled on a slidable collar 26, which rotates with and slides upon a sleeve 27, containing a shaft or rod 28, to which said collar 26, is connected by means of a transverse pin.

Another slidable collar or clutch member 29, is slidably mounted on said sleeve 27, and is suitably connected to said actuating shaft 28, by means of a pin 30, and the ends of said collar clutch member 29, are serrated, as shown clearly in Fig. 7. The pin 30, which of course extends through the clutch collar 29, as well as the sleeve 27, and shaft or rod 28, constrains said clutch collar to rotate with said sleeve 27.

Two transparent display signals are provided, namely a stop signal 31, and a turn signal 32, each one of which is actuatable into signaling position by the clutch collar member 29. A spring 33, normally wound about the sleeve 27, bears at one of its ends against a collar 34, which in turn bears against a bevel pinion 35, and said spring at its other end bears against the sliding collar 26, to normally thrust the same forwardly, thus normally maintaining the clutch collar 29, in engagement with the stop signal 31. Said sleeve 27, is journaled in a bearing 36, secured on the chassis frame member 3, and also in a bearing member 37, forming a part of the bracket 38, which is likewise secured to said frame member 3, the bevel pinion 35, being keyed upon the sleeve 27, and prevented from longitudinal movement thereon under the impulse of the spring 33, by the bearing portion 37, of said bracket 38.

Thus whenever the pinion 35, is rotated, the sleeve 27, rotates therewith and consequently the clutch collar 29, and either one or the other of the stop and turn signal members 31 and 32, respectively, move therewith, depending upon the position of said clutch collar 29. A plug member 39, closes the outer end of the sleeve 27, and is secured to said sleeve in any suitable manner, and besides affording a stop for the longitudinally movable rod 28, as well, forms a pivot upon which the signal member 32, is supported.

Journaled in said bracket 38, is a shaft 40, on one end of which is secured a large bevel gear 41, meshing with the bevel pinion 35, and on its other end with a crank 42 to which is pivotally connected a link 43, which at its other end is pivotally connected to a crank 44, depending from the shaft 15.

Suitable stops 45, and 46, respectively, are disposed conveniently on the rear of the vehicle, as shown in Fig. 2, to limit the movement of the signal arms 31, and 32, and a guard or screen 47, is secured on the chassis frame member 3, and projects outwardly to protect and conceal the signal members when the same are in position out of use. It is to be noted that the arms of the signal members are angled, and this is for the purpose of affording a space between the rear of the vehicle body and the transparent disks Stop and Turn respectively, of the signal members, so that when the same are thrown upwardly into display position they are in front of the tail light 48, on the vehicle, so as to be easily visible at night.

The operation is as follows:

In slowing up a car or bringing the same to a stop the operator instinctively actuates the clutch and brake foot pedals in succession. Inasmuch as the clutch pedal is usually actuated before the brake pedal, I have shown the actuating mechanism for my automatic signaling means as connected to the clutch pedal, although it is clearly obvious that the mechanism may be connected to any other lever on the vehicle or even to the steering apparatus, to throw the signaling means into operation.

When the operator of a vehicle intends to slow up or stop the car, the downward movement of the clutch pedal is transferred to the signal means through the crank 12, rod 13, and crank 14, and thence from the transverse shaft 15, to the bevel gear 41, through the suitable link and crank connections described. Thus the rotation of the bevel gear 41, effected by movement of the clutch lever, serves to rotate the bevel pinion 35, and consequently the clutch collar 29, which being normally in engagement with the stop signal member 31, raises the same into signaling position, and of course when the clutch pedal is released, a reverse movement of the bevel gear takes place, thus lowering the signaling member to concealed position. However, when a turn is to be made, the operator moves his foot upwardly on the clutch pedal 11, and depresses the pin 19, which throws the bell crank lever 18, inwardly upon the curved crank arm 17, so that as the clutch lever is depressed said crank 17, is also moved, and such movement is transmitted to the signal member 32, through suitable connections similar to those already described. The sleeve 23, is thus actuated to project the collar 26, inwardly, and of course the clutch collar 29, therewith, causing the latter to engage the turn signal member 32, and of course the downward movement of the clutch pedal having caused a rotation of the gear 41, as before, rotation of said clutch collar member 29, engaged with the turn signal member 32, causes an elevation of the latter to visible position.

The purpose of curving the crank arm 17, is to prevent actuation thereof when the clutch pedal is actuated without depressing the pin 19, and when such is the case the bell crank 18, will merely track over the curved portion of the crank 17, and cause no movement thereof.

The serrations on the clutch member and upon the signal members are merely for the purpose of insuring a good frictional contact therebetween, but not a positive engagement, so that in the event of a partial or incomplete movement of a signal member, due to a mistake by the operator, the mechanism cannot be damaged. Also if the operator should depress the pin 19, thus causing an elevation of the turn member with a downward movement of the clutch pedal, then should allow the clutch pedal to return to normal without the pin 19, still depressed, of course the turn signal member would not be positively returned to concealed position and there would be a tendency to jam the stop member, owing to the engagement of the clutch member 29, with said latter member under the impulse of the spring 33. But as stated, the serrations do not effect a positive engagement of the members and no damage can occur, and furthermore the signal members are constructed to normally fall by gravity into the concealed position unless positively supported in position for use by the mechanism, so that at no time, owing to the inadvertence of the operator, can a signal member be left in displayed position after the clutch pedal has returned to normal.

I claim as my invention:

1. An automatic signaling device for automobiles comprising signal members, mechanism for pivotally supporting the same at the rear of an automobile, a clutch mechanism adapted to selectively engage the signal members and mechanism for operating the clutch mechanism connected with and operated by one of the operating levers of the automobile.

2. In a device of the class described a plurality of signal members, a clutch mechanism adapted to engage any of said signal members, mechanism for adjusting the signal engaged into signaling position and a mechanism adapted to actuate the clutch and signal adjusting mechanisms collectively or independently.

3. In an automobile signaling device, a plurality of signals, mechanism for pivotally mounting said signals at the rear of the automobile, a clutch mechanism normally engaging one of the signals, and cooperating mechanisms adapted to shift the signal normally engaged to view position or to shift the clutch to engage any signal and to throw the signal so engaged to view position.

4. In a device of the class described, a plurality of signal members, a unitary clutch element therebetween, means for selectively elevating each one of said signal members into position for use, a plurality of driving means for said element, and mechanism connected to the controlling mechanism of a vehicle to cause movement of said driving means.

5. In a device of the class described signal members, clutch mechanism for operating the same connected to the controlling lever of a vehicle to which the same is attached and mechanism pivotally secured on said lever and extending therethrough operated by the operator to entrain said clutch mechanism with said signal members to cause selective movement of said signal members into position for use.

6. A signaling device for automobiles comprising a plurality of signals, a clutch normally engaging one of the signals, mechanism for operating the clutch to selectively engage any other signal, mechanism for actuating the signal engaged by the clutch to view position and mechanism for automatically returning the clutch to its normal engaging position after being released.

7. A signaling device for automobiles comprising a plurality of concentric shafts, signals rotatable on said shafts, a clutch on one of said shafts adapted to rotate the signals and mechanism for operating the clutch to engage any of the signals and adjust the signal to view position.

In testimony whereof I have hereunto subscribed my name in the presence of two subscribing witnesses.

CHARLES C. RENSHAW.

Witnesses:
CHARLES W. HILLS, Jr.,
FRANK K. HUDSON.